(12) United States Patent
Clarberg

(10) Patent No.: US 10,762,700 B2
(45) Date of Patent: Sep. 1, 2020

(54) GENERATING RANDOM SAMPLING DISTRIBUTIONS USING STOCHASTIC RASTERIZATION

(71) Applicant: Intel Corporation, Santa Clara, CA (US)

(72) Inventor: Franz P. Clarberg, Lund (SE)

(73) Assignee: Intel Corporation, Santa Clara, CA (US)

(*) Notice: Subject to any disclaimer, the term of this patent is extended or adjusted under 35 U.S.C. 154(b) by 456 days.

(21) Appl. No.: 15/398,042

(22) Filed: Jan. 4, 2017

(65) Prior Publication Data
US 2017/0213384 A1 Jul. 27, 2017

Related U.S. Application Data

(63) Continuation of application No. 13/992,313, filed as application No. PCT/US2012/042302 on Jun. 13, 2012, now Pat. No. 9,542,776.

(60) Provisional application No. 61/586,912, filed on Jan. 16, 2012.

(51) Int. Cl.
G06T 17/20 (2006.01)
G06T 15/04 (2011.01)
G06T 15/20 (2011.01)
G06T 15/40 (2011.01)
G06T 11/00 (2006.01)
G06T 15/00 (2011.01)
G06T 15/50 (2011.01)

(52) U.S. Cl.
CPC ............ *G06T 17/20* (2013.01); *G06T 11/001* (2013.01); *G06T 15/005* (2013.01); *G06T 15/04* (2013.01); *G06T 15/205* (2013.01); *G06T 15/405* (2013.01); *G06T 15/503* (2013.01); *G06T 2210/12* (2013.01)

(58) Field of Classification Search
None
See application file for complete search history.

(56) References Cited

U.S. PATENT DOCUMENTS 4,897,806 A 1/1990 Cook
6,292,194 B1 9/2001 Powell, III
6,803,916 B2 10/2004 Ramani
(Continued)

FOREIGN PATENT DOCUMENTS

CN 1434971 A 8/2003
CN 1748229 A 3/2006
(Continued)

OTHER PUBLICATIONS

John Alex, Seth Teller, Immediate-Mode Ray-Casting, 1999, MIT Technical Report MIT LCS TR-8XX, pp. 2-19.*
(Continued)

*Primary Examiner* — Michael J Cobb
(74) *Attorney, Agent, or Firm* — Trop, Pruner & Hu, P.C.

(57) ABSTRACT

Stochastic rasterization may be used as a flexible volumetric sampling mechanism. By bounding and tessellating the sampling domain, uniform sampling distributions over an arbitrary domain can be efficiently generated in up to five dimensions. Sample placement allows pseudo-random, stratified random, or blue noise sampling. Random sampling with an adaptive density function may be achieved by adding one dimension.

12 Claims, 6 Drawing Sheets

(56) References Cited

U.S. PATENT DOCUMENTS

| | | | |
|---|---|---|---|
| 6,940,514 B1 | 9/2005 | Wasserman et al. | |
| 7,675,526 B2 | 3/2010 | Hunter | |
| 9,117,309 B1* | 8/2015 | Crow | G06T 11/203 |
| 2002/0050979 A1 | 5/2002 | Oberoi et al. | |
| 2002/0171658 A1 | 11/2002 | Ramani et al. | |
| 2004/0212619 A1* | 10/2004 | Saito | G06T 15/005 |
| | | | 345/441 |
| 2006/0200658 A1 | 9/2006 | Penkethman | |
| 2006/0209065 A1 | 9/2006 | Lapidous et al. | |
| 2007/0097145 A1 | 5/2007 | Akenine-Möller | |
| 2008/0057929 A1 | 3/2008 | Min | |
| 2008/0122866 A1* | 5/2008 | Dorbie | G06T 11/40 |
| | | | 345/626 |
| 2008/0168435 A1 | 7/2008 | Tupman et al. | |
| 2010/0053176 A1 | 3/2010 | Koduri et al. | |
| 2011/0148876 A1* | 6/2011 | Akenine-Moller | G06F 8/41 |
| | | | 345/421 |
| 2012/0274636 A1* | 11/2012 | Akenine-Moller | G06T 15/40 |
| | | | 345/420 |
| 2012/0281004 A1 | 11/2012 | Cook et al. | |
| 2013/0069943 A1* | 3/2013 | Kallio | G06T 15/005 |
| | | | 345/420 |
| 2015/0269770 A1* | 9/2015 | Jenkins | G06T 15/20 |
| | | | 345/421 |
| 2015/0294498 A1* | 10/2015 | Mei | G06T 13/80 |
| | | | 345/420 |
| 2017/0249779 A1* | 8/2017 | Obert | G06T 15/06 |

FOREIGN PATENT DOCUMENTS

| | | |
|---|---|---|
| CN | 1774725 A | 5/2006 |
| CN | 101533522 A | 9/2009 |
| CN | 101604454 A | 12/2009 |
| CN | 101984465 A | 3/2011 |
| CN | 102074046 A | 5/2011 |
| KR | 1020080022551 | 3/2008 |

OTHER PUBLICATIONS

PCT International Search Report and Written Opinion issued in corresponding PCT/US2012/042302 dated Mar. 28, 2013, (9 pages).

Diego Nehab, Philip Shilane, Stratified Point Sampling of 3D Models, 2004, Proceedings of the First Eurographics Symposium on Point-Based Graphics SPBG '04, pp. 1-8.

Leif Kobbelt, Mario Botsch, A Survey of Point-Based Techniques in Computer Graphics, 2004, Computers & Graphics 28(2004), pp. 801-814.

Jingwan Lu, Pedro V. Sander, Adam Finkelstein, Interactive Painterly Stylization of Images, Videos and 3D Animations, 2010, Proceedings of the 2010 ACM SIGGRAPH Symposium on Interactive 3D Graphics and Games, pp. 127-134.

Barbara J. Meier, Painterly Rendering for Animation, 1996, Proceedings of the 23rd Annual Conference on Computer Graphics and Interactive Techniques, pp. 477-484.

Li-Yi Wei, Parallel Poisson Disk Sampling, 2008, ACM Transactions on Graphics (TOG), 27(3), Article No. 20, pp. 1-9.

D. Cline, S. Jeschke, K. White, A. Razdan, P. Wonka, Dart Throwing on Surfaces, 2009, Proceedings of the Twentieth Eurographics Conference on Rendering, pp. 1217-1226.

Praveen Bhaniramka, Rephael Wenger, Roger Crawfis, Isosurface Construction in any Dimension Using Convex Hulls, 2004, IEEE Transactions on Visualization and Computer Graphics 10(2):130-141.

Tamal K. Dey, Joachim Giesen, Samrat Goswami, Shape Dimension and Approximation from Samples, 2002, Proceedings of the Thirteenth Annual ACM-SIAM Symposium on Discrete Algorithms, pp. 772-780.

Robert L. Cook, Loren Carpenter, Edwin Catmull, The Reyes Image Rendering Architecture, 1987, Proceedings of the 14th annual conference on Computer graphics and interactive techniques SIGGRAPH '87, pp. 95-102.

Robert L. Cook, Stochastic Sampling in Computer Graphics, 1986, ACM Transactions on Graphics (TOG), 5(1):51-72.

M. McGuire, E. Enderton, P. Shirley, D. Luebke Real-Time Stochastic Rasterization on Conventional GPU Architectures 2010, Proceedings of the Conference on High Performance Graphics HPG '10, pp. 173-182.

Kayvon Fatahalian, Edward Luong, Solomon Boulos, Kurt Akeley, William R. Mark, Pat Hanrahan, Data-Parallel Rasterization of Micropolygons with Defocus and Motion Blur, 2009, Proceedings of the Conference on High Performance Graphics HPG '09, pp. 59-68.

Akenine-Möller and Jacob Ström, Graphics Processing Units for Handhelds, 2008, Proceedings of the IEEE, 96(5):779-789.

CN office action in corresponding CN application No. 201280067225.8 dated Jun. 2, 2016.

CN office action in corresponding CN application No. 201280067225.8 dated Jan. 18, 2017.

* cited by examiner

GENERATING RANDOM SAMPLING DISTRIBUTIONS USING STOCHASTIC RASTERIZATION

CROSS-REFERENCE TO RELATED APPLICATION

This application is a continuation application claiming priority to U.S. patent application Ser. No. 13/992,313 filed Jun. 7, 2013, and provisional application Ser. No. 61/586,912 filed Jan. 16, 2012, which claims benefit from a 371 application number PCT/US12/42302 filed Jun. 13, 2012, hereby expressly incorporated by reference herein.

BACKGROUND

This relates generally to graphics processing.

Sampling is a core operation in a wide variety of disciplines, such as computer graphics, scientific visualization, engineering and medical applications. Examples in graphics include rendering, texture synthesis, object placement, and geometry processing. However, efficient sampling of an arbitrary domain is non-trivial, especially in higher dimensions and/or with non-uniform distributions.

BRIEF DESCRIPTION OF THE DRAWINGS

Some embodiments are described with respect to the following figures.

DETAILED DESCRIPTION

Figure 1:
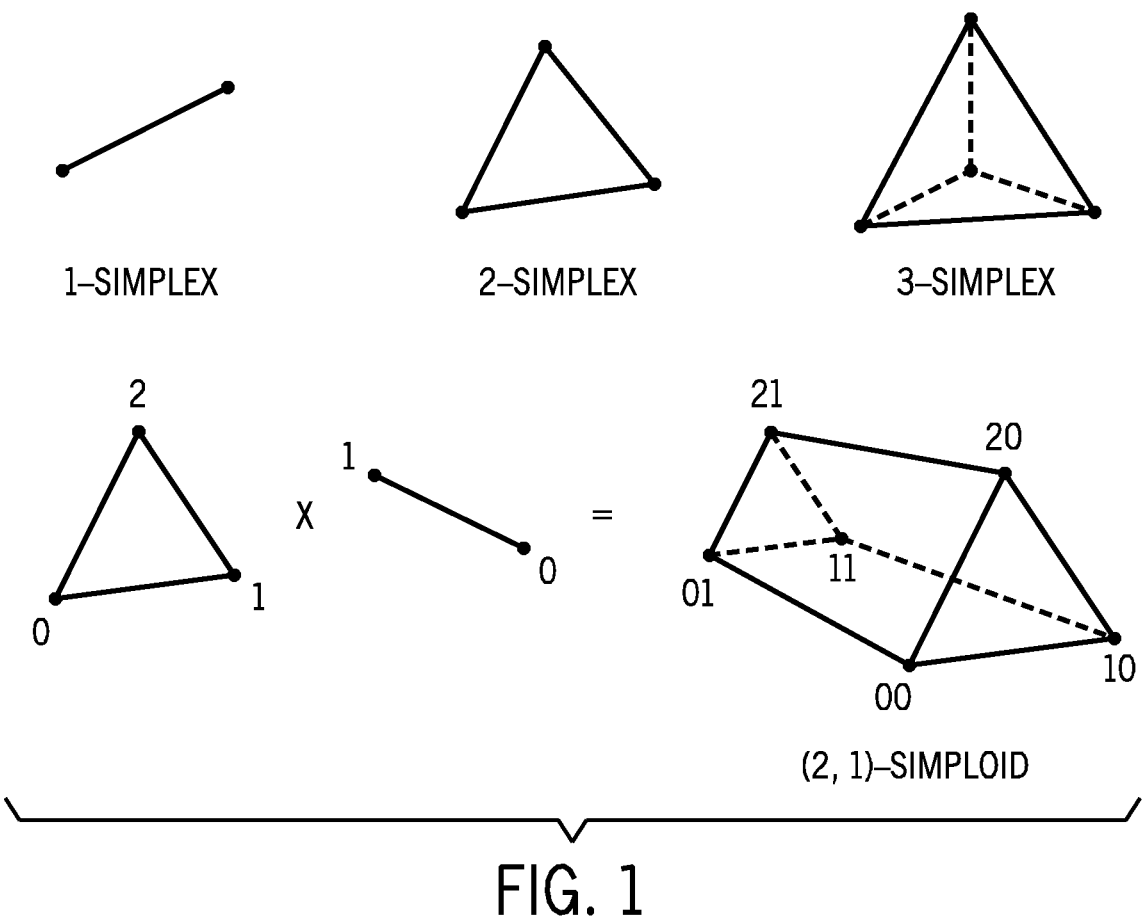
FIG. 1 is a depiction of simplex and simploid geometry in up to three dimensions.

Stochastic rasterization can be exploited as a flexible tool to generate samples over an arbitrary domain in up to five dimensions. This leverages efficient tile-based stochastic rasterization and provides application for these algorithms, besides rendering of motion blur and depth of field. Similarly, the traditional rasterizer of current graphic processing units (GPUs) can be used as a sampling tool in up to two dimensions.

Many sampling methods generate samples in parallel on the graphics processing unit (GPU) shader cores running in compute mode. In contrast, we exploit the built-in rasterizer to perform all or parts of the sampling operations. As it runs in fixed-function hardware, a large number of samples can be generated very power-efficiently in some embodiments. Our algorithms can be implemented as an additional hardware unit in the graphics processor, entirely in software, or as a combination of the two.

Exploiting the volumetric extent of primitives enables a number of interesting applications. The ideas may be viewed in terms of stochastic rasterization, but even the traditional rasterizer in current GPUs may be a helpful tool for generating one or two-dimensional sample distributions in a power-efficient way.

Formally, the five-dimensional (5D) rasterization pipeline is primarily designed to evaluate a function $\vec{f} : \mathbb{R}^5 \to \mathbb{R}^2$, where $\vec{f}$ is an integral projection onto the image plane x,y of a 5D light field, $\vec{L}(x,y,u,v,t)$, convoluted by an appropriate reconstruction filter to reduce aliasing and noise. $\vec{L}$ is defined by placing triangles in three-dimensional xyz-space, with linear per-vertex motion in time, t, and shear in the xy-plane controlled by the lens coordinates, u,v. The amount of shear is a function of depth, z, which is time-dependent. The user can also specify axis-aligned clip planes to limit the extents of u,v,t considered for each primitive. Each clip plane is given as a lower and upper boundary, e.g., $t \in [\underline{t},\overline{t}]$.

The value of $\vec{L}$ (e.g., color), is computed by executing a programmable shader program for each sample (supersampling) or group of samples (multisampling or decoupled sampling).

The rasterization process is usually illustrated in three-dimensional (3D) clip space by moving/shearing a triangle's vertices, but it can equivalently be seen as the triangle carving out a volumetric shape, $\mathcal{S}$, in 5D xyuvt-space. This domain is filled with uniformly distributed sample points, and the rasterizer quickly determines which ones are inside $\mathcal{S}$. The analogy in two dimensions (2D) is a triangle in screen space, which cuts out a set of samples from a uniform sampling of x,y. The volume of the shape directly controls the expected number of samples, N, placed in it, i.e., $E[N]=\rho V(\mathcal{S})$, where $\rho$ is the sampling density.

In 3D xyt-space, $\mathcal{S}$ is a generalized triangular prism with the triangular end caps placed at $t=\underline{t}$ and $t=\overline{t}$. Note that due to varying per-vertex motion and perspective foreshortening, the edges connecting the end caps may be curved and the sides are usually non-planar in xyt. This is non-intuitive, as the edges are always straight lines in clip space, although the sides may be bilinear patches. When one extra dimension, u, is added, each vertex is sheared in x as u varies. The amount of shear may be non-linear and differ for each vertex as it is a function of depth, which is time-dependent. The carved out hypervolume has 12 vertices, with end caps at u=$\underline{u}$ and u=$\overline{u}$ being generalized triangular prisms in 3D. Finally, in 5D, $\mathcal{S}$ is a complex shape with 24 vertices.

To sample an arbitrary domain, $\mathcal{D}$, we first construct a conservative bounding volume, $\mathcal{B}$, so that $\mathcal{D} \subseteq \mathcal{B}$. The bounding volume is then tessellated into a number of non-overlapping, adjacent primitives, $\mathcal{S}$, which are individually rasterized. In 2D, this corresponds to tessellating the interior of an arbitrary bounding polygon into triangles. Due to rasterization tie-breaking rules, any sample is guaranteed to be placed in at most one primitive. Finally, the pixel shader performs an analytical test per sample (in $\mathcal{B}$), to reject any remaining samples outside of $\mathcal{D}$. Collectively, the result is a uniform random sampling of $\mathcal{D}$; the hardware rasterizer performs an initial fast, but coarse sample culling, and the pixel shader performs a final fine-grained test (which can be skipped if $\mathcal{B}=\mathcal{D}$).

Figure 5:
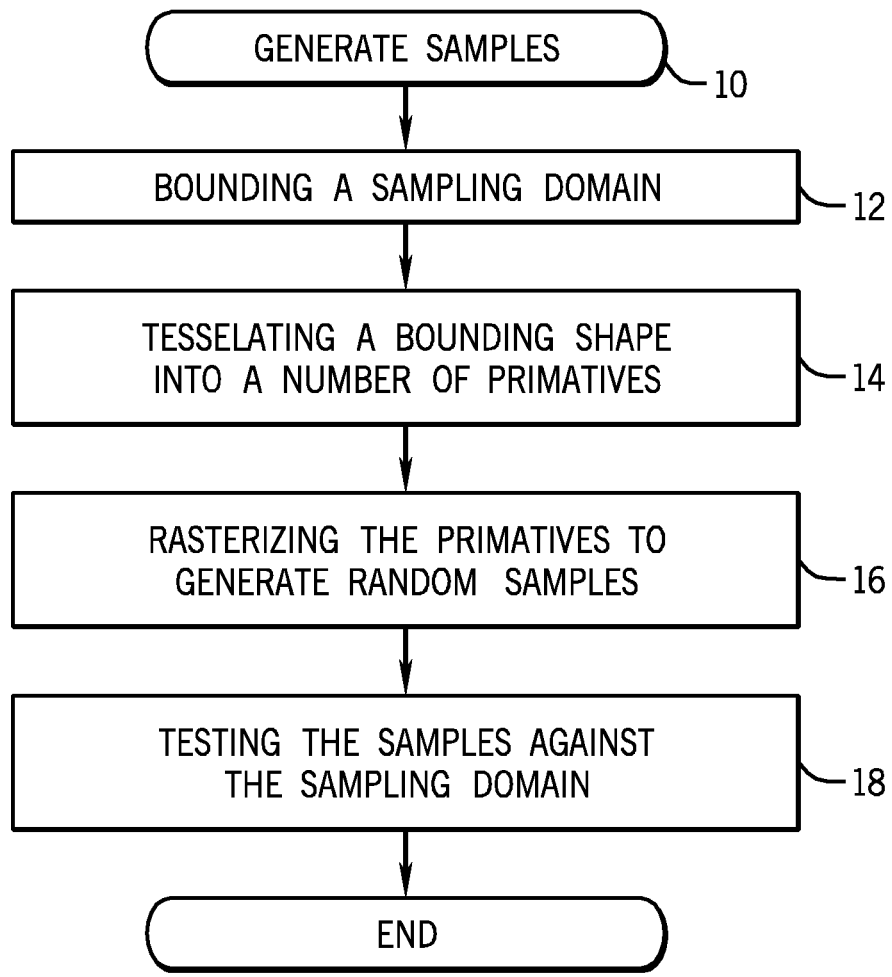
FIG. 5 is a flow chart for a sequence for generating samples.

Referring to FIG. 5, a sequence 10 for generating samples may be implemented in software, firmware and/or hardware. In software and firmware embodiments it may be implemented using computer executed instructions stored in one or more non-transitory computer readable media such as magnetic, optical or semiconductor storages.

Referring to FIG. 5, the sequence 10 may begin by bounding a sampling domain as indicated in block 12. A bounding shape may be tessellated into a number of primitives as indicated in block 14. Next the primitives are rasterized to generate random samples (block 16). Finally the samples are tested against the sampling domain as indicated in block 18.

Using the standard 5D rasterization pipeline, the hardware determines the xyuvt-coordinates of each sample, e.g., procedurally or based on a programmable sample table, coupled with random scrambling in some embodiments. Samples can be assumed to have reasonably good spectral properties, in order to reduce noise in traditional motion and defocus blur rendering. The hardware may put an upper limit on the sampling density.

To allow full flexibility and to avoid any bias introduced by a deterministic sampling, we can alternatively use a conservative 5D rasterization pipeline. In this case, the pixel shader receives as input, bounds on the extent of $\mathcal{S}$ over the lens and in time, i.e., $\hat{u}$, $\hat{v}$, and $\hat{t}$. Each such bound is given as a lower and upper limit, e.g., $\hat{u}=[\underline{u},\overline{u}]$, indicating in which range the primitive is conservatively overlapping the pixel. Based on these bounds, any number of samples may be generated, for example, using a random number generator based on cryptographic hashes. Note that in this case, samples have to be manually tested against $\mathcal{S} \cap \mathcal{D}$, not just $\mathcal{D}$, since adjacent primitives may have partially overlapping u, v, and t bounds. It may also be harder to ensure good spectral properties between pixels. The efficiency of this approach will be likely be lower as the sample tests are moved to software, but it relaxes most, if not all, of the limitations that the hardware may otherwise impose.

To make $\mathcal{S}$ easier to work with, we can restrict the vertex locations in such a way that all sides of the primitive are planar in the sampling space. For example, in the 3D case, if we restrict each vertex to not move in depth, and we restrict each pair of edges in the triangular end caps of the generalized prism to be parallel, all edges will be straight and all sides planar. The resulting shape is a tapered triangular prism.

In general, we can place the vertices so that $\mathcal{S}$ is an n-polytope (a geometric object with flat sides in n-dimensions), where n≤5. In this case, the class of polytopes generated by the stochastic rasterizer in 3D, 4D and 5D are formally defined as (2,1), (2,1,1), and (2,1,1,1)-simploids respectively. For clarification, we will give a brief definition. An $(n_1, n_2, \ldots, n_m)$-simploid is a polytope in $\Sigma n_i$-dimensional space that is isomorphic to the product of the $n_i$-simplices. An n-simplex is the simplest possible n-dimensional polytope, consisting of n+1 vertices, with all pairs connected by edges. For example, a 1-simplex is a line, a 2-simplex is a triangle, and a 3-simplex is a tetrahedron as shown in FIG. 1. An $(n_1, n_2, \ldots, n_m)$-simploid has $\Pi_i(n_i+1)$ vertices. Edges connect each pair of vertices that differ in only one index, where the vertices are labeled $i_1 \ldots i_m$, with $0 \leq i_j < n_j$. FIG. 1 shows simplices in up to three dimensions, and an (2,1)-simploid, i.e., triangular prism.

A fundamental property of simploids is that they can be decomposed into a set of simplices. For example, the triangular prism rendered by the 3D rasterizer is a (2,1)-simploid, which can be decomposed into three 3-simplices (tetrahedrons). Hence, we have an efficient way of generating random points in the union of three tetrahedrons, instead of sampling each one individually using explicit methods.

For more complex geometries, it may be possible to use existing algorithms for tessellating the volume $\mathcal{B}$ into simplices, e.g., tetrahedral elements, and then merge these into appropriate simploids. This process must take the constraints of the stochastic rasterizer into account, in order to generate compatible simploids. Many existing mesh generation algorithms may be applicable, as they often need to fulfill different, competing constraints. Mesh generation in two and three dimensions is a well-studied problem with many applications in physical simulation (e.g., finite-element analysis and fluid dynamics), medical visualization, and elsewhere. The problem is less well explored in higher dimensions, but some methods do generalize. For example, Delaunay triangulations can be computed in any dimension. An algorithm that is fast and robust in up to six dimensions, which has applications in 4D space-time, 6D phase-space in physics, and robotics is an example. In our case, we are interested in generating simplices that are compatible with the stochastic rasterizer. This constraint significantly limits the amount of freedom available.

We merge the generated simplices into appropriate simploids, which can be efficiently sampled by the stochastic rasterizer. For example, in three dimensions, we merge groups of three tetrahedrons into triangular prisms.

When running the rasterizer in conservative mode, it is possible to manually compute bounds in even higher dimensions, in addition to the $\hat{u}$, $\hat{v}$, and $\hat{t}$ bounds provided by the hardware tile tests. This allows sample generation in more than five dimensions.

Similarly, instead of using bounds in x, y and t, we can let the triangle carve out a region of xyz-space. In this case the depth bounds, $\hat{z}$, provided by the tile tests are used to control sample placement. This assumes running in conservative mode with manual sample placement, as the hardware does not sample the z-dimension by itself. The advantage is that vertices move in straight lines in xyz-space, so there is more flexibility in creating polytopes with planar sides than in xyt-space.

We will describe a few applications for our framework. These should be seen as examples. Many new and existing sampling algorithms may benefit from exploiting current and future fixed-function rasterization hardware for general-purpose sample generation.

One application is to directly use the rasterizer as a uniform sample generator, capable of stratified random sampling of an arbitrary domain in up to five dimensions. Other sampling distributions are possible by changing how samples are computed for the rasterizer. Uniform random samples are useful in many applications, such as Monte Carlo integration and scientific visualization. Generating the many (often hundreds of millions) points required can otherwise be time-consuming. In integration problems, the sampling domain is bounded, tessellated, and rasterized as described. The pixel shader then evaluates the integrand at each sample, and writes out the point-sampled result. Scientific visualization often has similar requirements such as distributing samples over an arbitrary domain and computing a function value (e.g., color) at each point.

Figure 2:
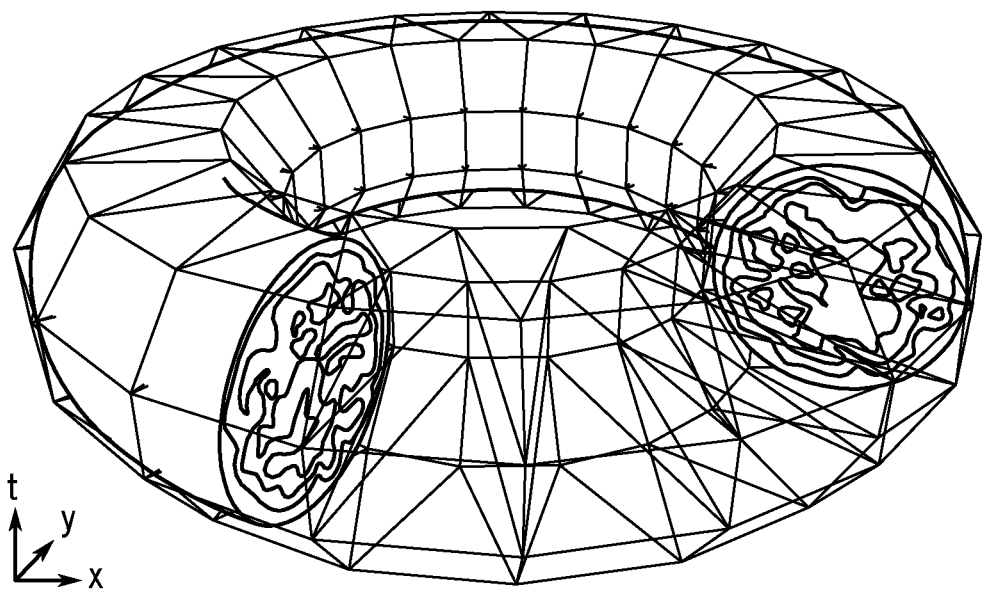
FIG. 2 is a depiction of a numerical integration problem in three dimensions, involving a temperature function over a toroidal domain.

FIG. 2 shows a simple example of a numerical integration problem in three dimensions (3D), where the integrand is defined over a toroidal domain, $\mathcal{D}$. In this example, the integrand is a simulated temperature function, which is numerically integrated by densely sampling it in the stochastic rasterization pipeline. Generalized triangular prisms in xyt-space (i.e., motion-blurred triangles) are setup to conservatively enclose the integration domain. The torus-shaped bounding volume is tessellated into 120 such triangular prisms in xyt-space, which are stochastically rasterized to generate a large number of sample points. The pixel shader, which is executed for each sample, tests if the sample is inside $\mathcal{D}$, and if so, evaluates the temperature. The result is accumulated per pixel using additive blending, and finally hierarchically reduced to a single scalar value in a separate pass.

Dart throwing is a fundamental method for Poisson-disk sampling, i.e., generating distributions where all points are separated by a certain minimum distance. With a minimum distance of 2r, if a disk of radius r is placed at each sample point, no two disks overlap. A large minimum point distance ensures blue noise characteristics, which has proven ideal in many applications, e.g., antialiasing, stippling, and texture synthesis. In its basic form, dart throwing generates a large number of random candidate points over the sampling domain, $\mathcal{D}$, and test them for overlap to keep only the small subset that fulfills the minimum distance criteria.

Optimized algorithms for dart throwing utilize spatial data structures to keep track of the voids, V, between samples in order to guide the insertion of new candidate points. The voids can be represented as octree cells or general polytopes as two examples.

Figure 3:
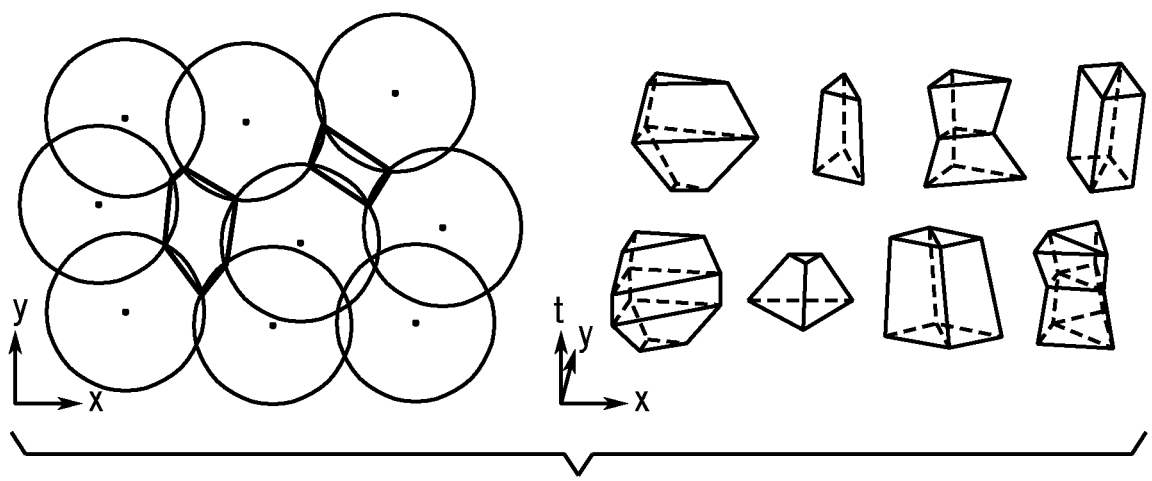
FIG. 3 is a depiction of optimized dart throwing.

FIG. 3 (left) shows some examples in 2D. Optimized dart throwing keeps track of voids in the sampling domain, i.e., regions where new points can be randomly inserted. The voids are found by placing a disk (sphere or hypersphere in higher dimensions) of radius 2r at each point. Any region not touched by a disk belongs to a void. We represent voids as polygons/polytopes, as shown on the left. Candidate points are generated in parallel by rasterizing all voids, after random displacement and appropriate scaling. Some examples in 3D are shown on the right in FIG. 3.

Conceptually, the sampling domain, $\mathcal{D}$, is first subdivided into voids, which are put in an "active" list. The following operations are then performed:

1. Select a void, V, from the active list with probability according to its volume.
2. Choose a random candidate point, p, in the void.
3. Check if p meets the minimum distance criteria with respect to the neighboring points, and if so, add it to the point set.
4. Check if V is completely covered, and if not, split it into smaller voids that are added to the active list.

The algorithm terminates when the active list is empty. At that point, a maxima/distribution has been achieved, i.e., no more points can be inserted. If the selection and sampling of voids is done with care, the distribution is also unbiased (there is an equal probability of placing a sample anywhere in the domain). Note that the above steps can be performed in parallel, either by drawing samples from voids that are sufficiently far apart not to conflict, or by allowing conflicts and eliminating them in an unbiased way.

Dart throwing may be accelerated by using stochastic rasterization to perform steps (1) and (2) on a large number of voids in parallel. Each void is represented as a single (or union of) simploids compatible with the rasterizer. FIG. 3 shows some examples of voids in 3D, created out of tapered triangular prisms. The expected number of samples in each void is controlled by uniformly scaling the void, and a random displacement is added to ensure uniform random sampling, even with a fixed sampling pattern. Both operations can be performed in the vertex shader. All voids in the active list are then rasterized with the depth test disabled, and the generated samples stored to an array, e.g., using atomics or append buffers in modern graphics application program interfaces (APIs). These represent candidate points, chosen with a probability according to the volume of each void. A compute pass processes the points to eliminate conflicts, and updates the active list by discarding and splitting voids. The new active list is again passed to the rasterizer, and so on.

Figure 6:
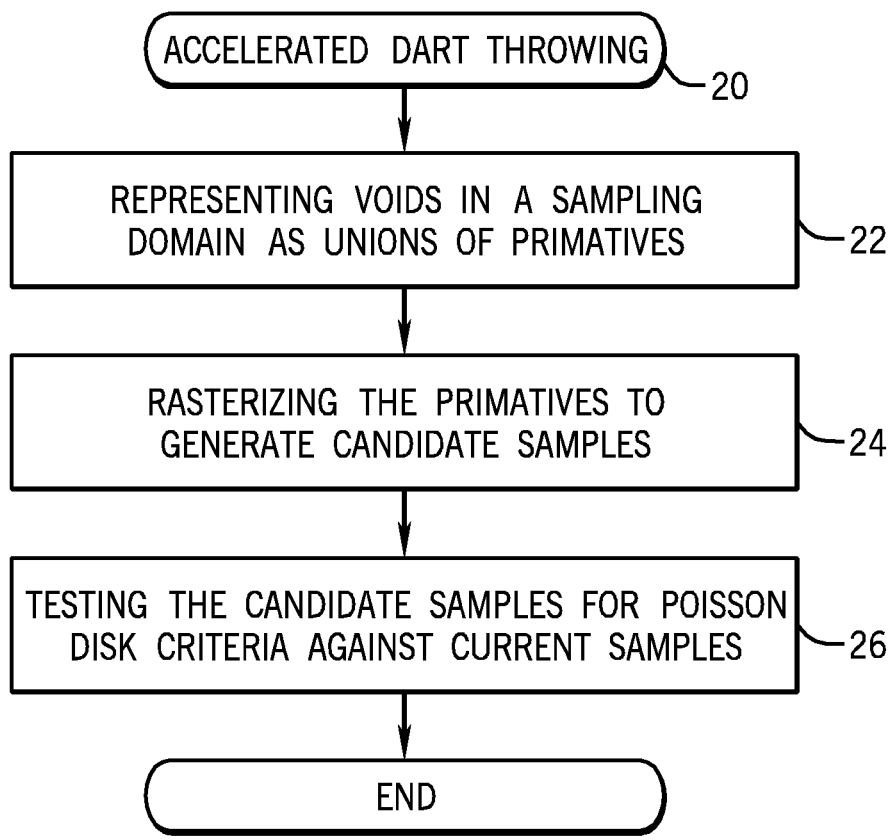
FIG. 6 is a flow chart for a sequence for accelerated dart throwing.

Referring to FIG. 6, a sequence 20 for accelerated dart throwing according to one embodiment may be implemented in software, firmware, and/or hardware. In software and firmware embodiments, it may be implemented by computer executed instructions stored in one or more non-transitory computer readable media such as a magnetic, optical or semiconductor storages.

The sequence 20 begins by representing voids in a sampling domain as unions of primitives as indicated in block 22. Then the primitives are rasterized to generate candidate samples as indicated in block 24. Finally the candidate samples are tested for Poisson disc criteria against the current samples as indicated in block 26.

The described algorithm can generate Poisson-disk points in up to five dimensions. By moving the selection and sampling steps to fixed-function hardware, a higher efficiency and simpler implementation is possible.

Non-uniformly distributed samples in n dimensions can be achieved by sampling uniformly over an appropriate domain in n+1 dimensions, and orthographically projecting the samples back to n dimensions. Intuitively, the shape of the sampling domain in $\mathbb{R}^{n+1}$ is defined by viewing the density function, $\rho(\vec{x})$, where $\vec{x} \in \mathbb{R}^n$, as a height field in the extra dimension. By generating samples under the height field $(\vec{x}, \rho(\vec{x})) \in \mathbb{R}^{n+1}$, and orthographically projecting on $\vec{x}$, we effectively get samples distributed according to $\rho(\vec{x})$.

Figure 4:
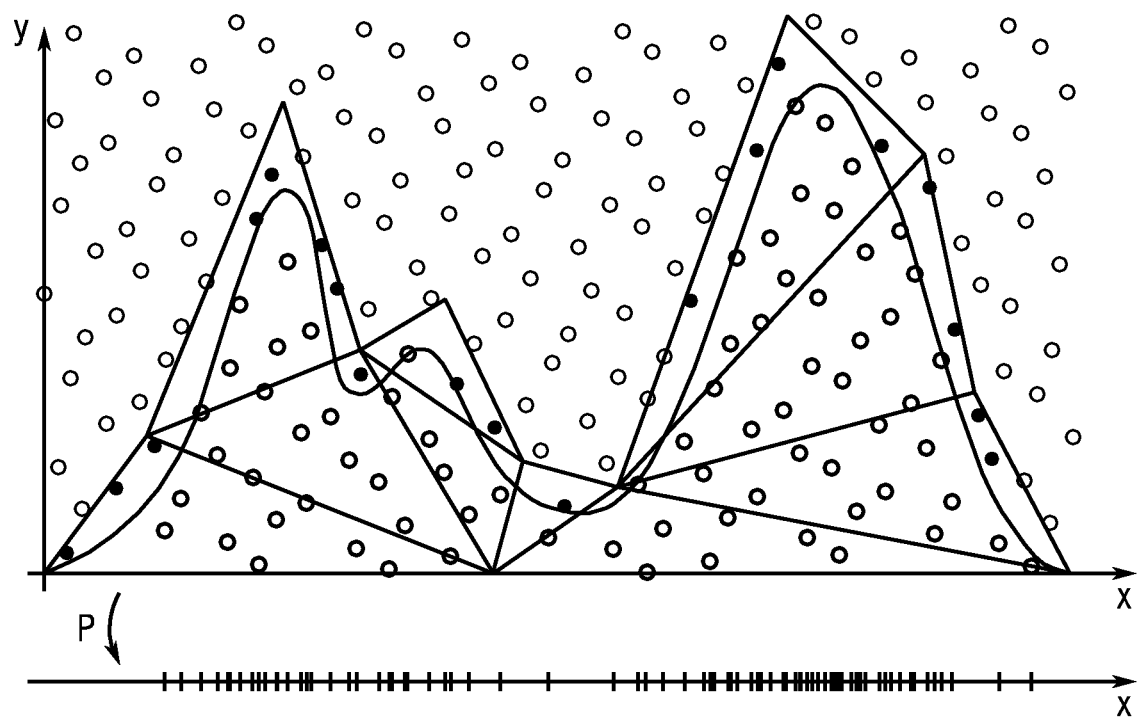
FIG. 4 is a graph of a density function depicting sampling with a non-uniform density.

The stochastic rasterizer may efficiently sample the height field $(\vec{x}, \rho(\vec{x}))$ in up to five dimensions. This allows non-uniform sampling in up to 4D. FIG. 4 shows a simple example where p is a one-dimensional (1D) density function. The function is bounded upwards, and the bounding shape tessellated into a number of rasterizer primitives, in this case 2D triangles. The height field is sampled by rasterizing the resulting triangles. The rasterizer quickly rejects all samples outside the primitives (OP). In the pixel shader, we perform a per-sample test against p to reject all remaining samples that lie outside (ROP). The accepted samples are finally projected on x, giving a distribution with the desired properties. Samples generated using this method have white noise characteristics. Due to the projection, it is difficult to ensure a minimum point distance (i.e., blue noise) as points may very well project to similar locations in $\vec{x}$. The same technique applies in higher dimensions, but the shape of the density function becomes less intuitive.

Figure 7:
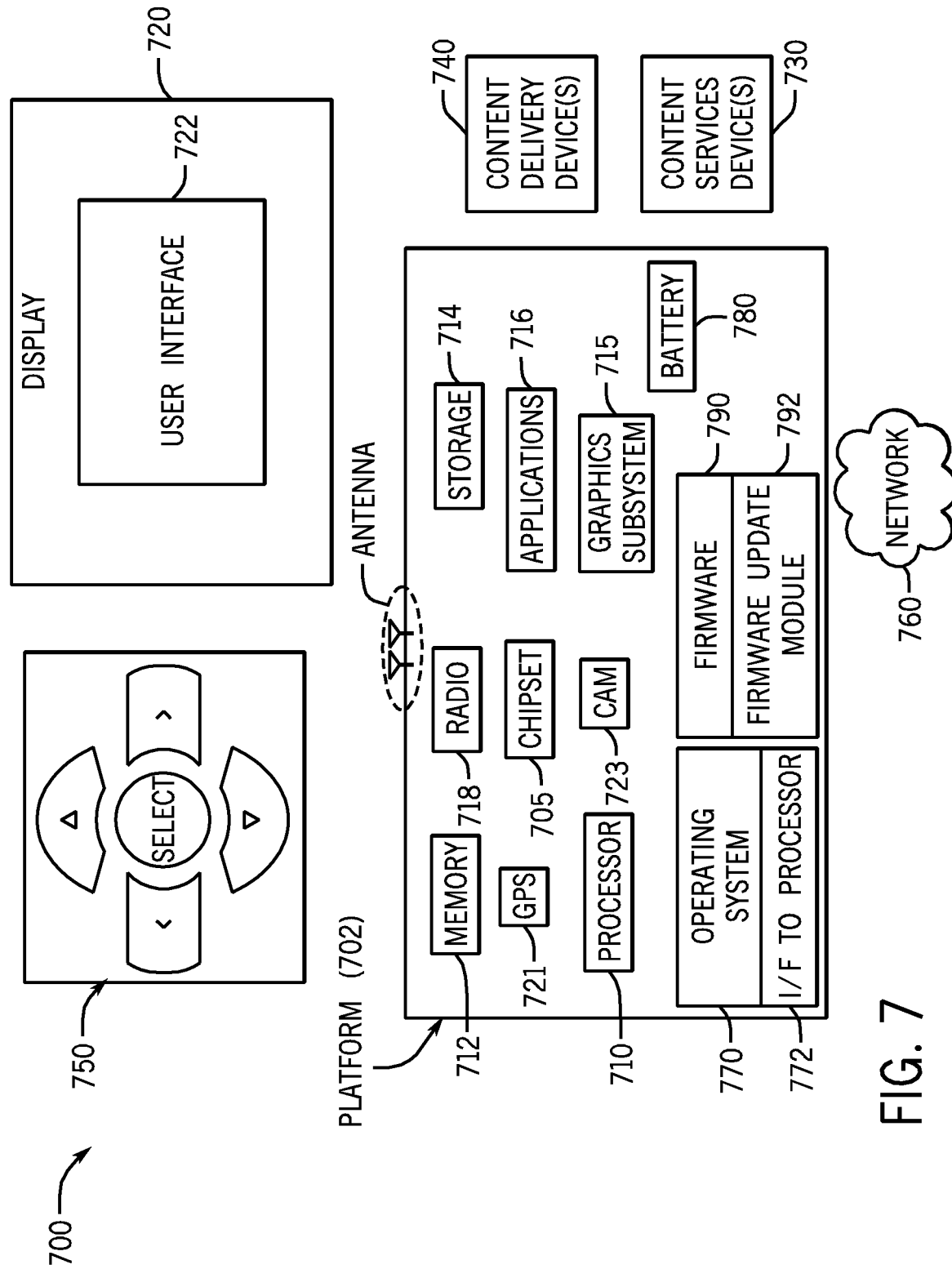
FIG. 7 is a system depiction for one embodiment.

FIG. 7 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716, global positioning system (GPS) 721, camera 723 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

In addition, the platform 702 may include an operating system 770. An interface 772 to the processor 710 may interface the operating system firmware 790, and firmware update module 792 and the processor 710.

Firmware 790 may be provided to implement functions such as the boot sequence. An update module to enable the firmware to be updated from outside the platform 702 may be provided. For example the update module may include code to determine whether the attempt to update is authentic and to identify the latest update of the firmware 790 to facilitate the determination of when updates are needed.

In some embodiments, the platform 702 may be powered by an external power supply. In some cases, the platform 702 may also include an internal battery 780 which acts as a power source in embodiments that do not adapt to external power supply or in embodiments that allow either battery sourced power or external sourced power.

The sequences shown in FIGS. 5 and 6 may be implemented in software and firmware embodiments by incorporating them within the storage 714 or within memory within the processor 710 or the graphics subsystem 715 to mention a few examples. The graphics subsystem 715 may include the graphics processing unit and the processor 710 may be a central processing unit in one embodiment.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit embodiments of the invention.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the invention.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 7.

Figure 8:
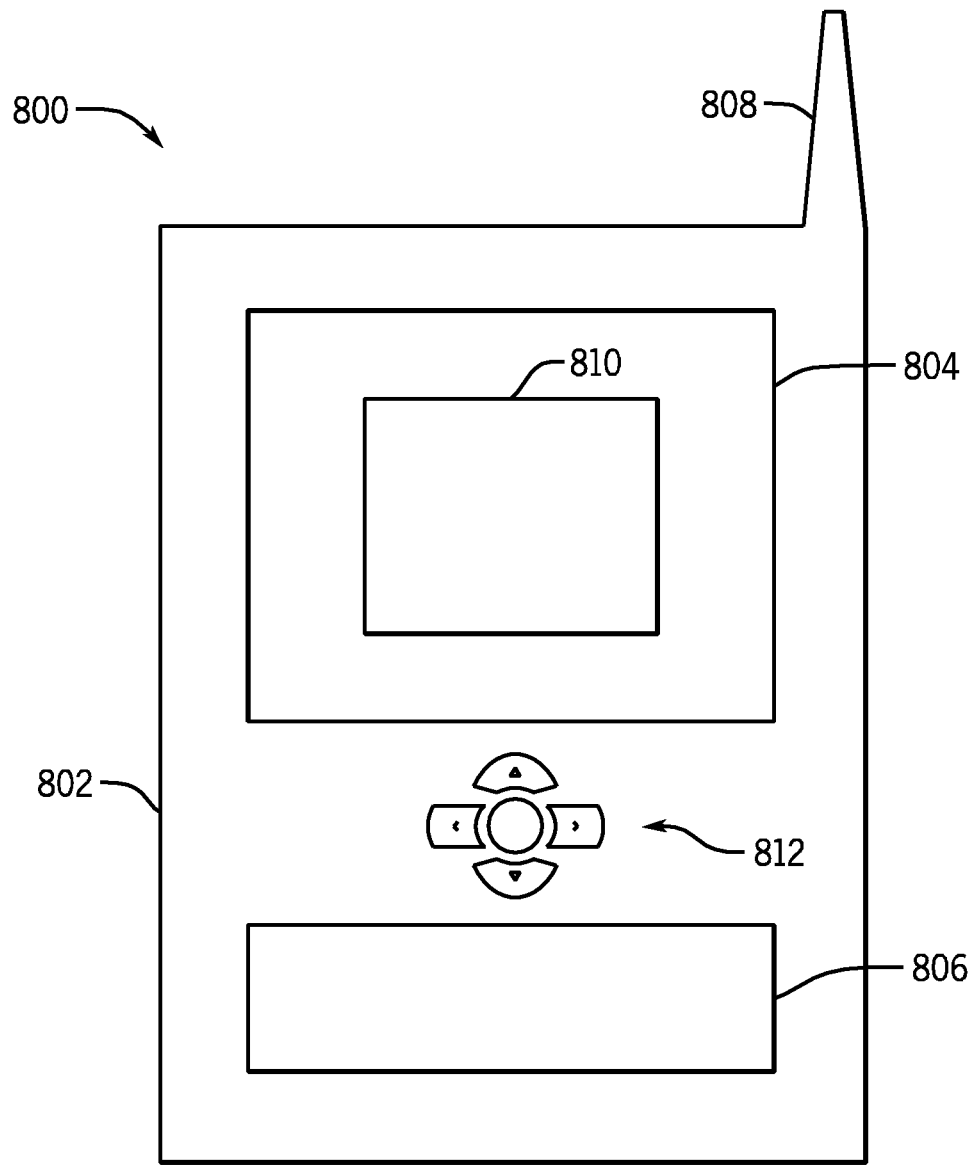
FIG. 8 is a front elevational view for one embodiment.

As described above, system 700 may be embodied in varying physical styles or form factors. FIG. 8 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 8, device 800 may comprise a housing 802, a display 804, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

The following examples pertain to further embodiments. A method may include using a rasterizer to generate samples over an arbitrary domain by bounding the sampling domain, tessellating a bounding shape into a number of primitives, rasterizing the primitives to generate random samples, and testing the samples against the sampling domain. The method may also involve using stochastic rasterization to generate samples over an arbitrary domain, using conservative rasterization to allow arbitrary sample placement within each pixel, computing bounds for additional dimensions, for generating samples in a higher dimension than the rasterizer supports, using a rasterizer with programmable sample placement to allow pseudo-random distributions, generating adaptive sampling distributions using the method by representing the density function as a height field, adding one dimension to the sampling domain, sampling this new domain using the rasterizer, and protecting the samples on the original domain. Some embodiments may include generating samples for numerical computations, or performing numerical integration over an arbitrary domain by generating samples over the domain using the rasterizer, evaluating the integrand at each sample in the pixel shader, and accumulating the result. A method may include accelerating dart throwing to generate Poisson disk samples by representing voids in a sampling domain as unions of primitives, rasterizing the primitives to generate candidate samples and testing the candidate samples for Poisson disk criteria against current samples. That method may also include using stochastic rasterization to generate Poisson disk samples, or using stochastic rasterization for motion or defocus blur. At least one machine readable medium may comprise a plurality of instructions and, in response to being executed on a computing device, causing the computing device to carry out a method described above. An apparatus may include a processor to use a rasterizer to generate samples over an arbitrary domain, bound the sampling domain, tessellate a bounding shape into a number of primitives, rasterize the primitives to generate random samples, and test the samples against the sampling domain and a memory coupled to said processor. The apparatus may include an operating system, a battery or firmware and a module to update said firmware. The processor may use stochastic rasterization to generate samples over an arbitrary domain, or use conservative rasterization to allow arbitrary sample placement within each pixel. The processor may compute bounds for additional dimensions, for generating samples in a higher dimension than the rasterizer supports. The processor may use a rasterizer with programmable sample placement to allow pseudo-random distributions. Also the processor may generate adaptive sampling distributions using the method by representing the density function as a height field, add one dimension to the sampling domain, sample this new domain using the rasterizer and produce the samples on the original domain.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

What is claimed is:

1. An apparatus comprising:
   a rasterizer to generate samples over a polygon, the rasterizer to:
   generate a bounded polygon;
   rasterize the bounded polygon into a number of primitives;
   rasterize the primitives to the samples; and
   determine whether the samples are inside or outside the polygon; and
   a storage coupled to said rasterizer.

2. The apparatus of claim 1, said apparatus to use stochastic rasterization to generate samples over an arbitrary domain.

3. The apparatus of claim 1, said apparatus to use stochastic rasterization for motion or defocus blur.

4. The apparatus of claim 1 including said rasterizer as part of a graphics processing unit.

5. A method comprising:
   generating samples over a polygon using a rasterizer;
   generating a bounded polygon;
   rasterizing the bounded polygon into a number of primitives;
   rasterizing the primitives to the samples; and
   determining whether the samples are inside or outside the polygon.

6. The method of claim 5, including using stochastic rasterization to generate samples over an arbitrary domain.

7. The method of claim 5, including using stochastic rasterization for motion or defocus blur.

8. The method of claim 5 including using said rasterizer as part of a graphics processing unit.

9. One or more non-transitory computer readable media storing instructions to perform a sequence comprising:
   generating samples over a polygon using a rasterizer:
   generating a bounded polygon;
   rasterizing the bounded polygon into a number of primitives;
   rasterizing the primitives to the samples; and
   determining whether the samples are inside or outside the polygon.

10. The media of claim 9, further storing instructions to perform a sequence including using stochastic rasterization to generate samples over an arbitrary domain.

11. The media of claim 9, further storing instructions to perform a sequence including using stochastic rasterization for motion or defocus blur.

12. The media of claim 9, further storing instructions to perform a sequence including using said rasterizer as part of a graphics processing unit.

* * * * *